United States Patent
Iwai et al.

(10) Patent No.: US 6,579,490 B1
(45) Date of Patent: Jun. 17, 2003

(54) APPARATUS FOR GENERATING COMPRESSION WAVES IN CONDUCTIVE LIQUID

(75) Inventors: Kazuhiko Iwai, Nagoya (JP); Shigeo Asai, Nagoya (JP); Qiang Wang, Nagoya (JP)

(73) Assignee: Nagoya University (JP)

( * ) Notice: Subject to any disclaimer, the term of this patent is extended or adjusted under 35 U.S.C. 154(b) by 182 days.

(21) Appl. No.: 09/657,288

(22) Filed: Sep. 8, 2000

(30) Foreign Application Priority Data

Oct. 5, 1999 (JP) .......................................... 11-284256

(51) Int. Cl.[7] ............................................. C21B 13/00
(52) U.S. Cl. ......................................... 266/44; 266/234
(58) Field of Search ................. 266/234, 44; 164/71.1, 164/511, 147.1, 250.1, 504

(56) References Cited

U.S. PATENT DOCUMENTS 3,911,997 A * 10/1975 Sugazawa et al. ....... 164/147.1
5,836,376 A * 11/1998 Matsui et al. ................ 164/504
5,988,261 A * 11/1999 Milorad et al. ............. 164/504
6,003,590 A * 12/1999 Pavlicevic et al. .......... 164/504

* cited by examiner

Primary Examiner—Scott Kastler
(74) Attorney, Agent, or Firm—Adams & Wilks

(57) ABSTRACT

An apparatus for generating compression waves in a conductive liquid comprises a vessel containing a conductive liquid and ac electromagnetic force applying means provided around the vessels for generating the compression waves to achieve improvement after solidification of the liquid by enchancing strength of the compression waves by setting the ac frequency "f" of ac electromagnetic force applying means only within the range defined by the expression $2/(L^2 \pi \mu \sigma) \leq f \leq (c^2 \mu \sigma)/2\pi$, wherein f is a major frequency when a waveform of an electromagnetic force is developed by the Fourier transform, for a non-sine waveform, L is a characteristic length of the system, such as a depth or a radius of the vessel, $\mu$ is the permeability of the conductive liquid, $\sigma$ is the electric conductivity of the conductive liquid, and c is the propagation velocity of the compression waves in the conductive liquid.

10 Claims, 9 Drawing Sheets

APPARATUS FOR GENERATING COMPRESSION WAVES IN CONDUCTIVE LIQUID

BACKGROUND OF THE INVENTION

1. Field of the Invention

The present invention relates to an apparatus for generating compression waves in a conductive liquid, such as a molten metal.

2. Description of the Related Art

There have been poured intensive efforts in developing a technique that generates compression waves in a molten metal contained in a container and aims at an improvement of the tissues after the solidification of the molten metal and an enhancement of refining capabilities. However, it is considered difficult, at the present stage, to efficiently achieve a higher strength of the compression waves, and satisfactory results have not yet been accomplished.

Accordingly, it is an object of the invention to provide an apparatus for generating compression waves in a conductive liquid contained in a vessel, which improves an ac electromagnetic force applying means that generates the compression waves directly in the conductive liquid contained in the vessel, and thereby enhances the strength of the compression waves sufficiently.

In order to accomplish the foregoing object, the invention discloses an apparatus for generating compression waves in a conductive liquid, which comprises a vessel containing a conductive liquid and an ac electromagnetic force applying means that generates the compression waves in the conductive liquid contained in the vessel, in which an ac frequency f of the ac electromagnetic force applying means is set within a range given by the following [expression 1]:

$$\frac{2}{L^2 \pi \mu \sigma} \leq f \leq \frac{c^2 \mu \sigma}{2\pi}$$

Here,

- f: frequency (a major frequency when a wave-form of an electromagnetic force is developed by the Fourier transform, in case of the wave-form being a non-sine wave)
- L: characteristic length of the system (for example, a depth, a radius of the vessel containing the conductive liquid)
- $\mu$: permeability of the conductive liquid
- $\sigma$: electric conductivity of the conductive liquid
- c: propagation velocity of the compression waves in the conductive liquid Further, the invention discloses an apparatus for generating compression waves in a conductive liquid, in which the ac electromagnetic force applying means is an ac magnetic field generating electromagnetic coil, which is provided around the circumference of the vessel.

Further, the invention discloses an apparatus for generating compression waves in a conductive liquid, in which a dc magnetic field generating electromagnetic coil is provided around the circumference of the vessel.

Further, the invention discloses an apparatus for generating compression waves in a conductive liquid, in which the dc magnetic field generating electromagnetic coil is a superconducting magnet, and the vessel and the ac magnetic field generating electromagnetic coil are inserted in the bore of the superconducting magnet.

Further, the invention discloses an apparatus for generating compression waves in a conductive liquid, in which the ac electromagnetic force applying means comprises a pair of electrodes that are installed at positions on the circumferential wall of the vessel facing to each other so as to energize the conductive liquid, and an ac power supply connected to the electrodes.

Further, the invention discloses an apparatus for generating compression waves in a conductive liquid, in which the dc magnetic field generating electromagnetic coil is provided around the circumference of the vessel provided with the electrodes.

Further, the invention discloses an apparatus for generating compression waves in a conductive liquid, in which the dc magnetic field generating electromagnetic coil is a superconducting magnet, and the vessel with a pair of the electrodes is inserted in the bore of the superconducting magnet.

Further, the invention discloses an apparatus for generating compression waves in a conductive liquid, in which the vessel is formed of ceramics and provided with a metal reinforcing material on the circumference thereof, and an ac magnetic field generating electromagnetic coil as the ac electromagnetic force applying means is provided overlying the vessel.

Further, the invention discloses an apparatus for generating compression waves in a conductive liquid, in which the dc magnetic field generating electromagnetic coil is provided around the circumference of the vessel.

Further, the invention discloses an apparatus for generating compression waves in a conductive liquid, in which the dc magnetic field generating electromagnetic coil is a superconducting magnet, and the vessel is inserted in the bore of the superconducting magnet.

According to the present invention relating to the aforementioned apparatus for generating compression waves in a conductive liquid, since the ac frequency of the ac electromagnetic force applying means that generates the compression waves in a conductive liquid contained in a vessel is set within an appropriate range by the reason described later, the compression waves can be generated with a sufficient strength. Thereby, degassing of the conductive liquid and micro structuring of the tissues are effectively processed, and material improvement after the solidification of the conductive liquid will be brought about efficiently.

And, when the ac magnetic field generating electromagnetic coil as the ac electromagnetic force applying means is installed around the circumference of the vessel, the compression waves will be generated in the conductive liquid with a simplified construction and a low cost.

And, when, in addition to the ac magnetic field generating electromagnetic coil, a dc magnetic field generating electromagnetic coil is further installed around the circumference of the vessel, the superimposition of both the electromagnetic coils effects a stronger generation of the compression waves in the conductive liquid contained in the vessel. Thereby, enhancement of the refining capabilities after the solidification of the conductive liquid and improvement of the tissues will sufficiently be accomplished.

Further, when, while the dc magnetic field generating electromagnetic coil is made up with a superconducting magnet, the foregoing vessel and the ac magnetic field generating electromagnetic coil are inserted in the bore of the superconducting magnet, the superimposition of both the dc magnetic field generating electromagnetic coil as the superconducting magnet and the ac magnetic field generating electromagnetic coil effects a still stronger generation of the compression waves in the conductive liquid contained in the vessel, and material improvement after the solidification of the conductive liquid is achieved still more efficiently.

Further, when the ac electromagnetic force applying means is made up with a pair of electrodes that are installed at positions on a circumferential wall of the vessel facing to each other so as to energize the conductive liquid in the vessel, and the ac power supply connected to the electrodes, and furthermore the dc magnetic field generating electromagnetic coil is installed around the circumference of the vessel, the ac magnetic field generating electromagnetic coil is not required. Accordingly, the total construction of the apparatus is simplified remarkably, and in addition, the compression waves are generated efficiently in the conductive liquid contained in the vessel so as to contribute to material improvement after the solidification of the liquid.

And, also in this case, when the dc magnetic field generating electromagnetic coil is made up with a superconducting magnet, in the bore of which is inserted the vessel with the electrodes, the effect of a strong electromagnetic force by the dc magnetic field generating electromagnetic coil as the superconducting magnet is superimposed on the effect by the ac electromagnetic force applying means by a pair of the electrodes, which generates the compression waves still more effectively in the conductive liquid contained in the vessel, thereby achieving material improvement after the solidification of the liquid.

Further, while the vessel maintains a sufficient strength reinforced by the metal reinforcing material, when it is provided with the ac magnetic field generating electromagnetic coil to overlie the vessel, the apparatus is able to generate intensified compression waves in the conductive liquid contained in the vessel without being influenced by the metal reinforcing material. Thus, degassing of the conductive liquid and micro structuring of the tissues are effectively processed, whereby material improvement after the solidification of the conductive liquid will be accomplished.

Further, when the superimposition effect by the ac magnetic field generating electromagnetic coil provided overlying the vessel and the dc magnetic field generating electromagnetic coil provided around the circumference of the vessel is configured to generate intensified compression waves in the conductive liquid contained in the vessel, the material improvement after the solidification of the conductive liquid will be achieved more appropriately.

And, when the dc magnetic field generating electromagnetic coil provided around the circumference of the vessel is made up with a superconducting coil in pursuit for the superimposition effect by association with the ac magnetic field generating electromagnetic coil provided overlying the vessel, a still stronger generation of the compression waves in the conductive liquid contained in the vessel will be brought about, and a sufficient material improvement after the solidification of the liquid will be accomplished.

DETAILED DESCRIPTION OF PREFERRED EMBODIMENTS

Figure 1:
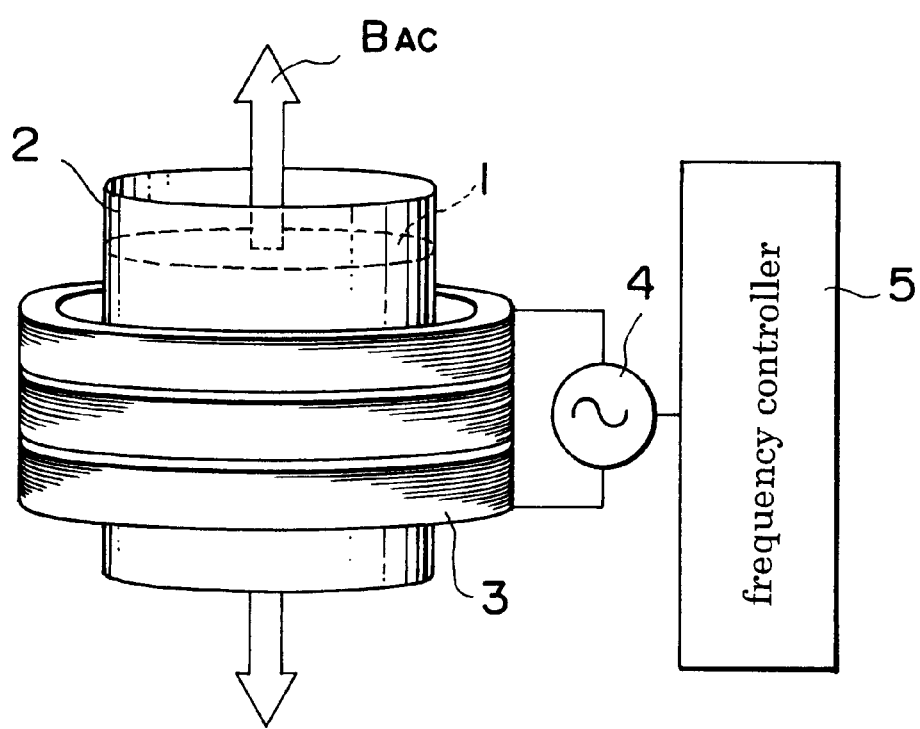
FIG. 1 is a perspective view to typically illustrate an apparatus for generating compression waves in a conductive liquid as a first embodiment of the present invention.
Figure 2:
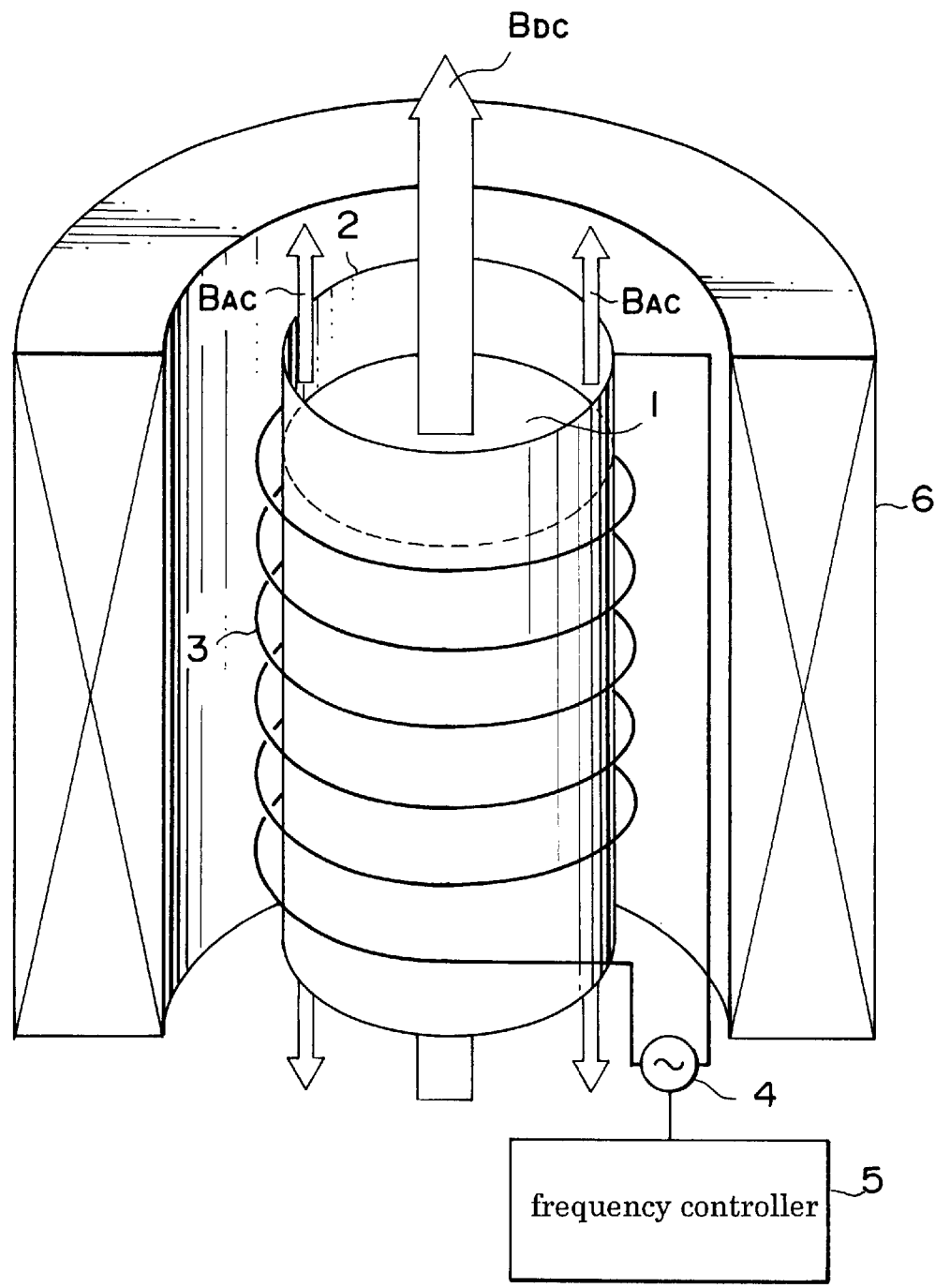
FIG. 2 is an explanatory drawing to typically illustrate an apparatus for generating compression waves in a conductive liquid as a second embodiment of the invention.
Figure 3:
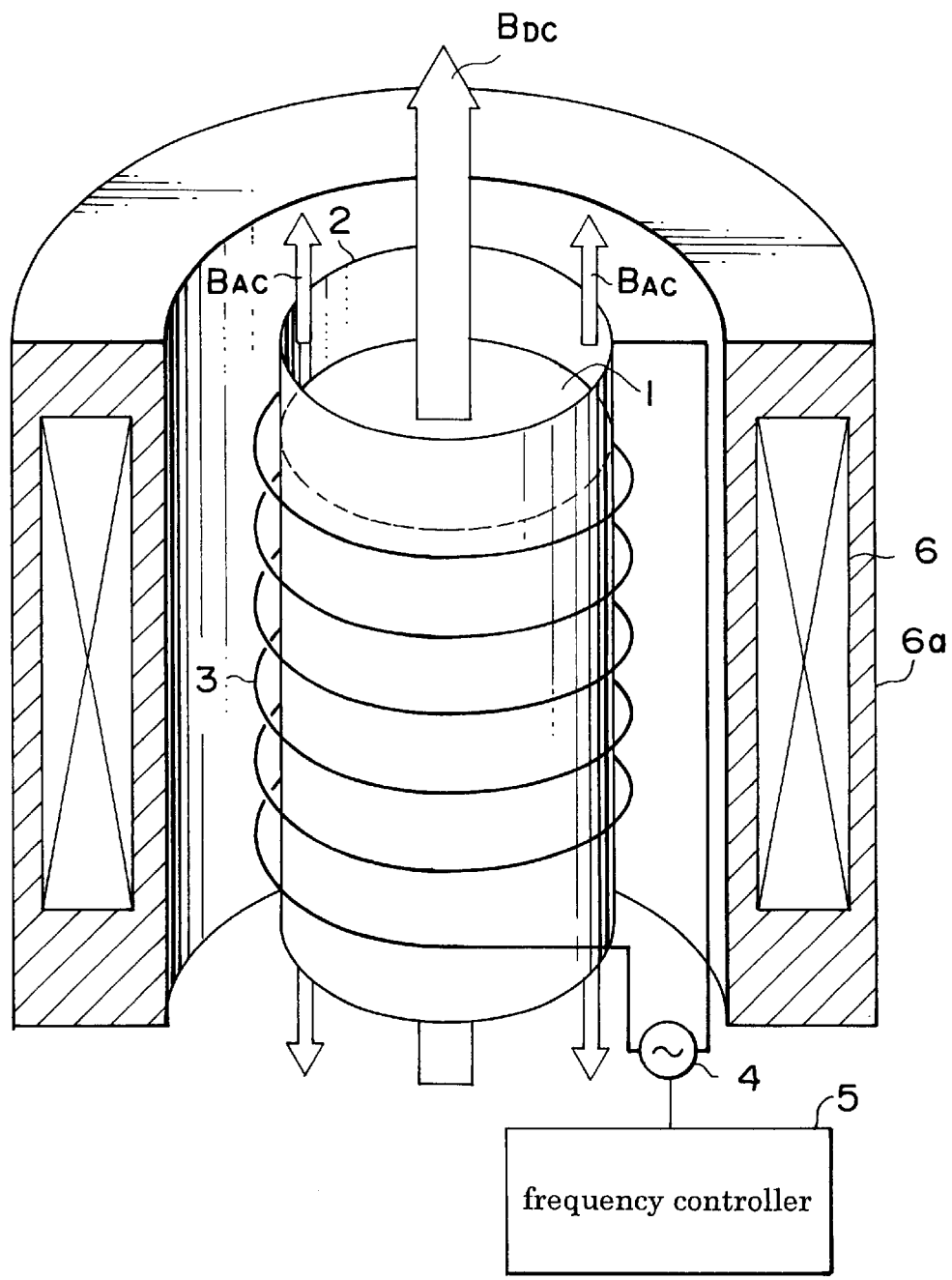
FIG. 3 is an explanatory drawing to typically illustrate an apparatus for generating compression waves in a conductive liquid as a third embodiment of the invention.
Figure 4:
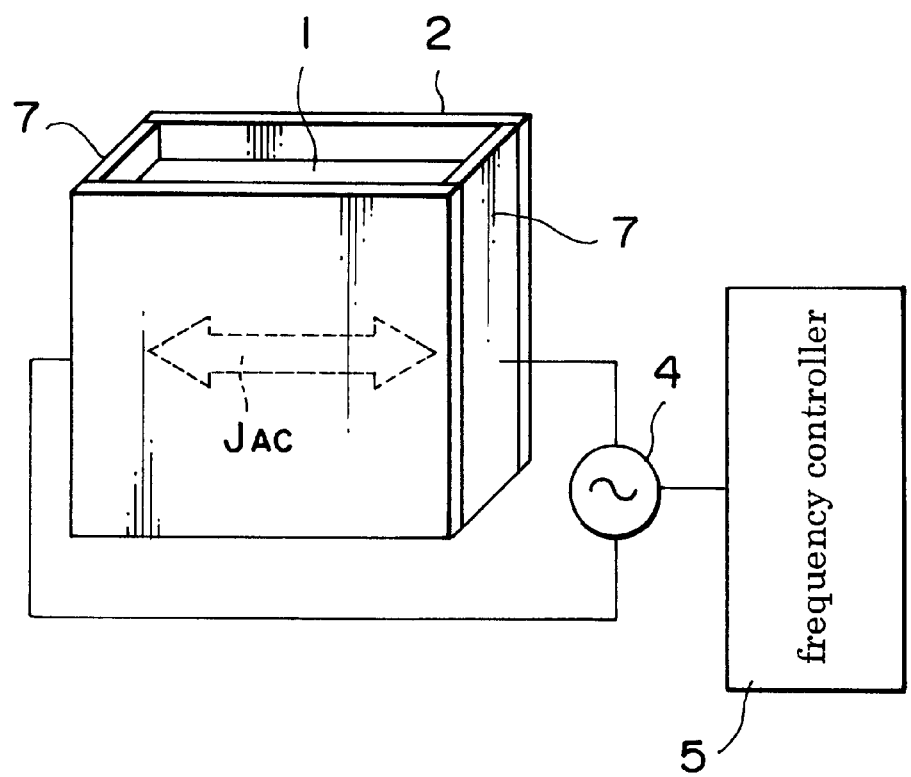
FIG. 4 is an explanatory drawing to typically illustrate an apparatus for generating compression waves in a conductive liquid as a fourth embodiment of the invention.
Figure 5:
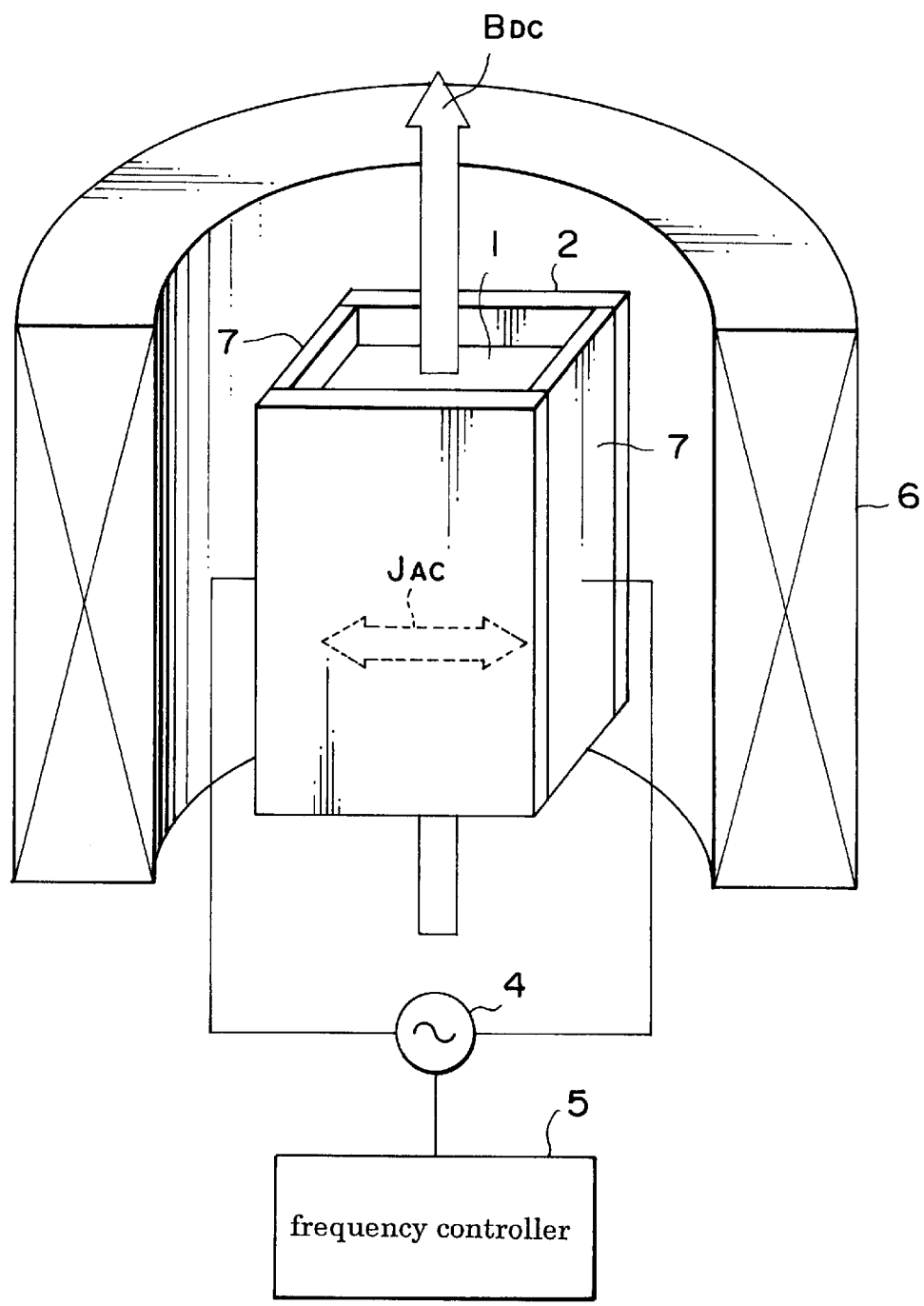
FIG. 5 is an explanatory drawing to typically illustrate an apparatus for generating compression waves in a conductive liquid as a fifth embodiment of the invention.
Figure 6:
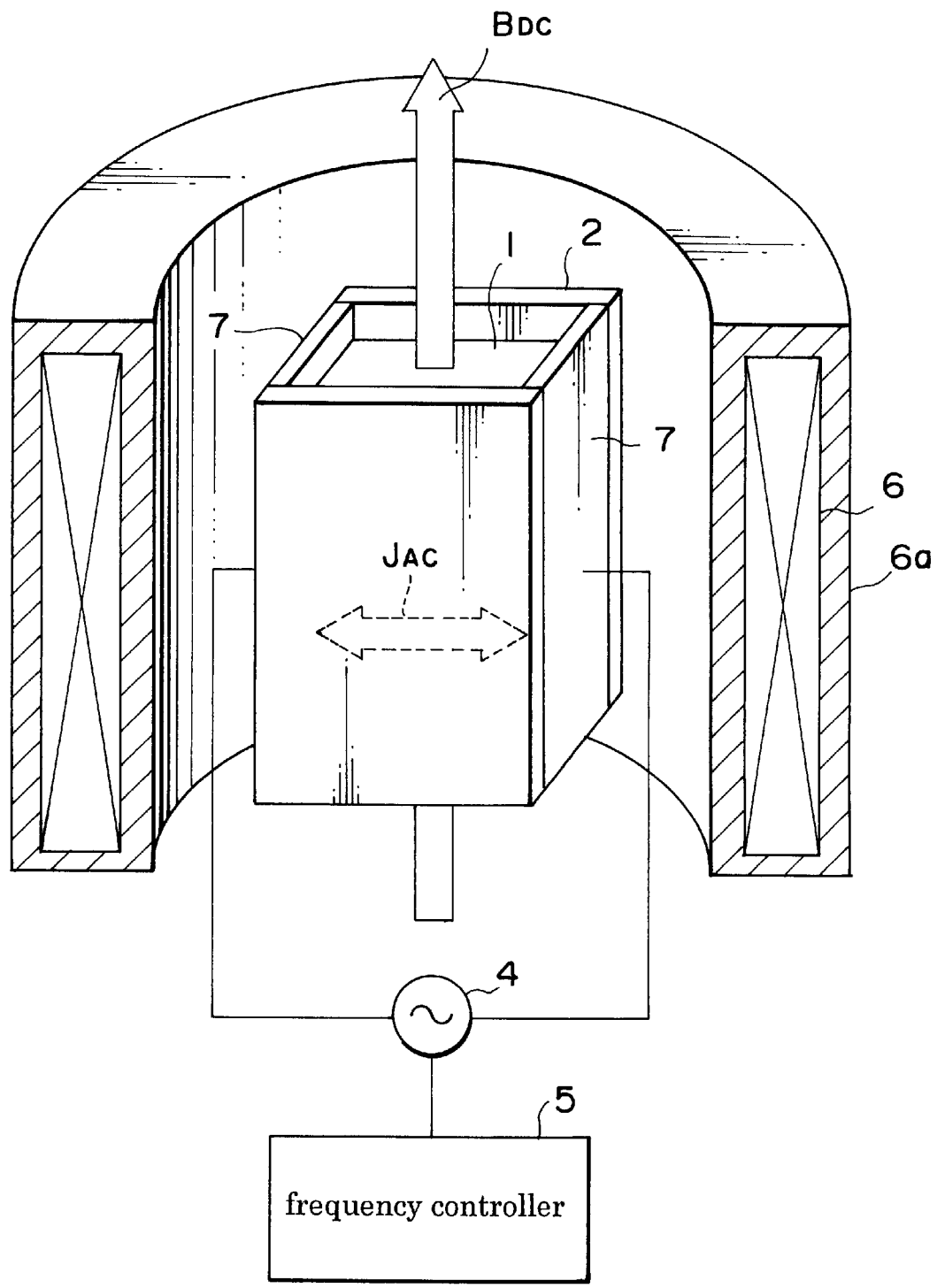
FIG. 6 is an explanatory drawing to typically illustrate an apparatus for generating compression waves in a conductive liquid as a sixth embodiment of the invention.
Figure 7:
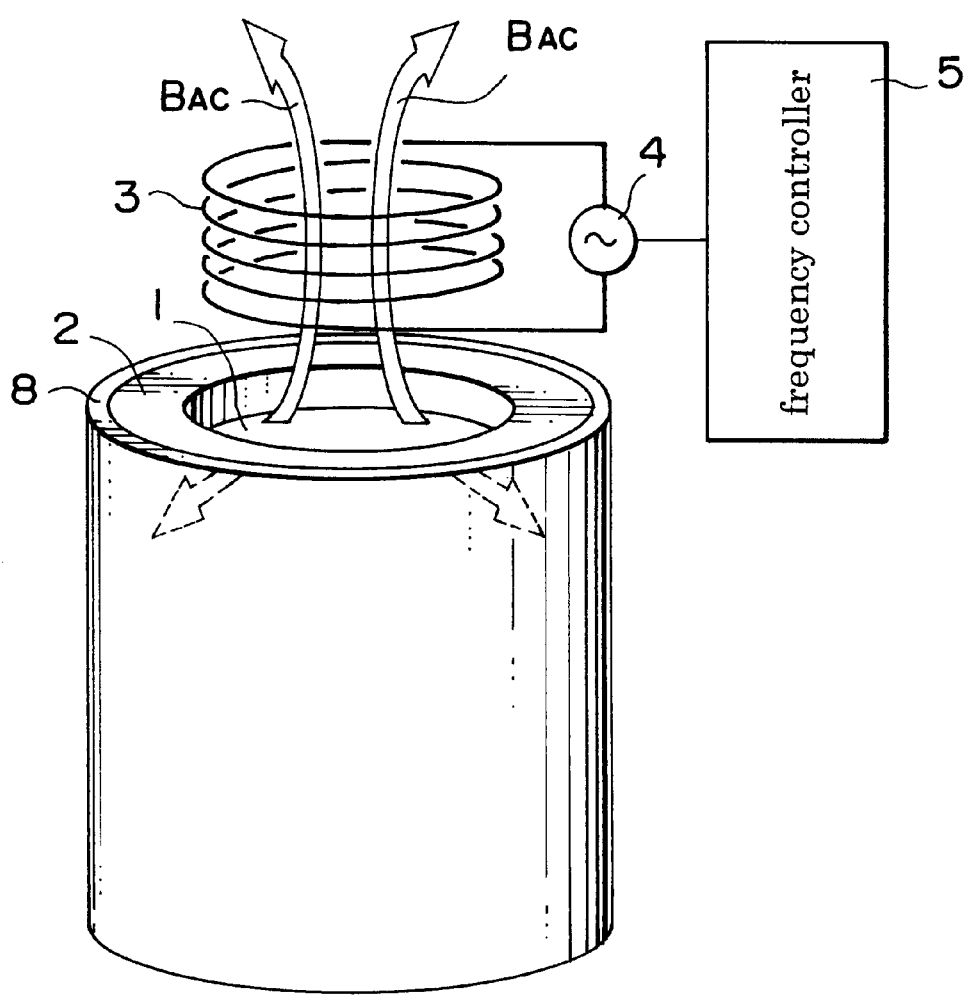
FIG. 7 is an explanatory drawing to typically illustrate an apparatus for generating compression waves in a conductive liquid as a seventh embodiment of the invention.
Figure 8:
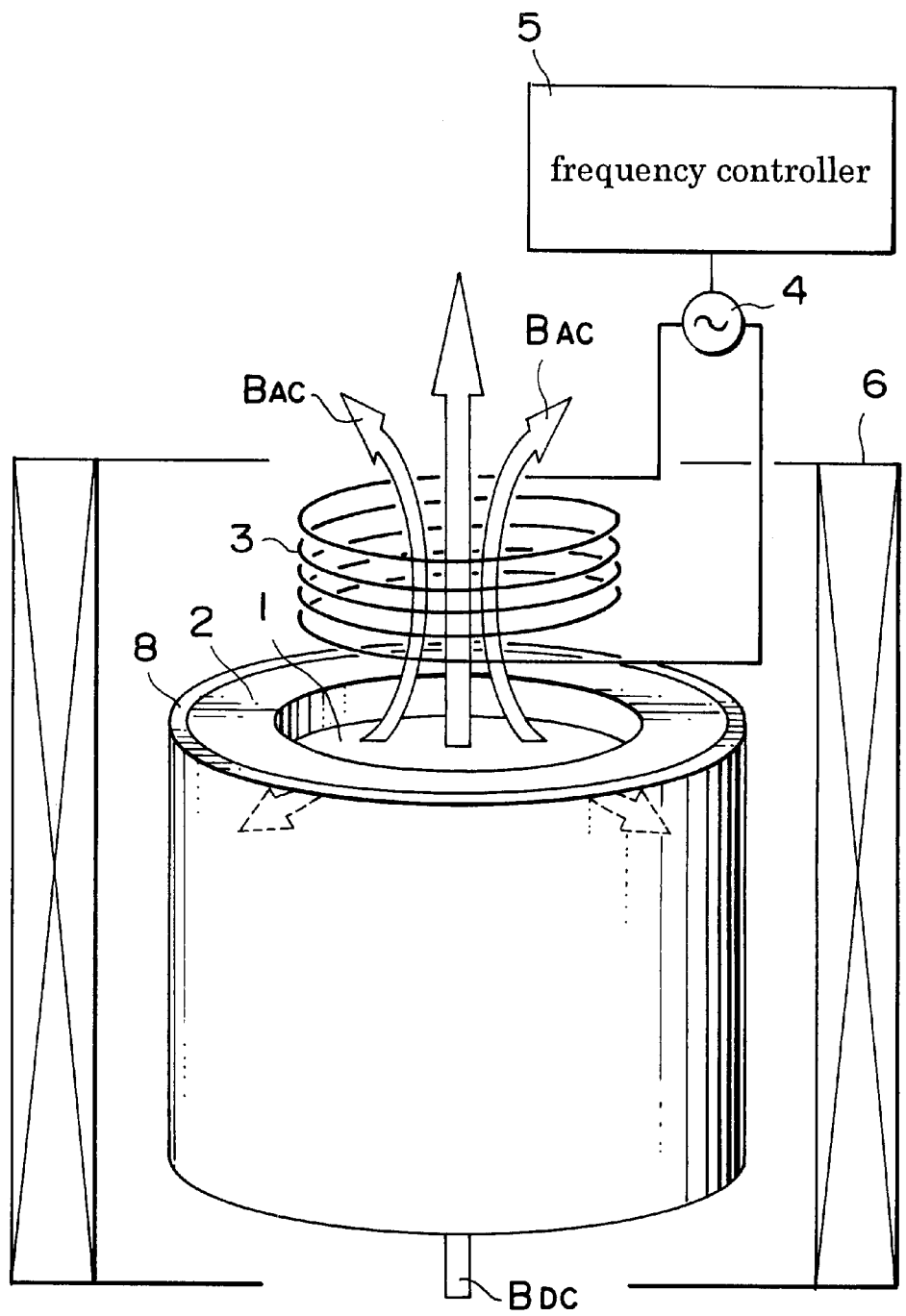
FIG. 8 is an explanatory drawing to typically illustrate an apparatus for generating compression waves in a conductive liquid as an eighth embodiment of the invention.

Hereunder, the preferred embodiments of the present invention will be described with reference to the accompanying drawings, in which FIG. 1 is a perspective view to typically illustrate an apparatus for generating compression waves in a conductive liquid as a first embodiment of the invention; FIG. 2 an explanatory drawing to typically illustrate an apparatus for generating compression waves in a conductive liquid as a second embodiment of the invention; FIG. 3 an explanatory drawing to typically illustrate an apparatus for generating compression waves in a conductive liquid as a third embodiment of the invention; FIG. 4 an explanatory drawing to typically illustrate an apparatus for generating compression waves in a conductive liquid as a fourth embodiment of the invention; FIG. 5 is an explanatory drawing to typically illustrate an apparatus for generating compression waves in a conductive liquid as a fifth embodiment of the invention; FIG. 6 an explanatory drawing to typically illustrate an apparatus for generating compression waves in a conductive liquid as a sixth embodiment of the invention; FIG. 7 an explanatory drawing to typically illustrate an apparatus for generating compression waves in a conductive liquid as a seventh embodiment of the invention; FIG. 8 an explanatory drawing to typically illustrate an apparatus for generating compression waves in a conductive liquid as an eighth embodiment of the invention; and FIG. 9 an explanatory drawing to typically illustrate an apparatus for generating compression waves in a conductive liquid as a ninth embodiment of the invention.

First, the first embodiment will be discussed. As shown in FIG. 1, the apparatus for generating compression waves comprises a vessel 2 containing a conductive liquid 1 (for example, molten metals, plastics, high-temperature liquid semiconductors, or ceramics, etc.), and an ac magnetic field generating electromagnetic coil 3 installed around the circumference of the vessel 2 as an ac electromagnetic force applying means, whereby a vertical ac magnetic field $B_{AC}$ can be generated.

And, in order to efficiently generate the compression waves in the conductive liquid 1 contained in the vessel 2, a frequency f of an ac power supply 4 for the ac magnetic field generating electromagnetic coil 3 is set by a frequency controller 5 within the range given by the [expression 1].

$$\frac{2}{L^2 \pi \mu \sigma} \leq f \leq \frac{c^2 \mu \sigma}{2\pi} \qquad \text{[expression 1]}$$

Here,
- f: frequency (a major frequency when a wave-form of an electromagnetic force is developed by the Fourier transform, in case of the wave-form being a non-sine wave)
- L: characteristic length of the system (for example, a depth, a radius of the vessel containing the conductive liquid)
- $\mu$: permeability of the conductive liquid
- $\sigma$: electric conductivity of the conductive liquid
- c: propagation velocity of the compression waves in the conductive liquid The reason why the frequency f is set within the foregoing range is as follows. That is, the range where an electromagnetic force acts on a conductive liquid practically covers a depth from the surface, which is known as the depth of electromagnetic penetration. Provided that this depth of electromagnetic penetration is greater than the characteristic length L of the system, the electromagnetic force will not be generated efficiently. Therefore, to efficiently generate the compression waves, it is necessary to make the depth of electromagnetic penetration smaller than the characteristic length L of the system. This condition is given by the [expression 2].

$$\frac{2}{L^2 \pi \mu \sigma} \leq f \qquad \text{[expression 2]}$$

On the other hand, a wavelength in a higher frequency region can be smaller than the depth of electromagnetic penetration. Under this condition, the compression waves cannot efficiently be generated. Therefore, to efficiently generate the compression waves, it is necessary to make the depth of electromagnetic penetration greater than the wavelength of the compression waves. This is given by the [expression 3].

$$f \leq \frac{c^2 \mu \sigma}{2\pi} \qquad \text{[expression 3]}$$

In the foregoing apparatus for generating compression waves in a conductive liquid as the first embodiment, the ac frequency f of the ac electromagnetic force applying means that generates the compression waves in the conductive liquid 1 contained in the vessel 2 is set within an appropriate range by the aforementioned reason, and the compression waves can be generated with a sufficient strength accordingly. Thereby, degassing of the conductive liquid and micro structuring of the tissues are effectively processed, and material improvement after the solidification of the liquid will be brought about efficiently.

And, since the ac electromagnetic force applying means is installed around the circumference of the vessel 2 as the ac magnetic field generating electromagnetic coil 3, the generation of the compression waves in the conductive liquid contained in the vessel will be carried out with a simplified construction and a low cost.

Next, the apparatus for generating compression waves in a conductive liquid as the second embodiment of the invention will be described. As shown in FIG. 2, also in this embodiment, the apparatus comprises the vessel 2 containing the conductive liquid 1 (for example, molten metals or plastics, etc.), and the ac magnetic field generating electromagnetic coil 3 installed around the circumference of the vessel 2 as the ac electromagnetic force applying means, whereby the ac magnetic field $B_{AC}$ can be generated vertically.

And, in order to efficiently generate the compression waves in the conductive liquid 1 contained in the vessel 2, the frequency f of the ac power supply 4 for the ac magnetic field generating electromagnetic coil 3 is set by the frequency controller 5 within the range given by the [expression 1].

In this second embodiment, a dc magnetic field generating electromagnetic coil 6 is further installed so as to surround the circumference of the vessel 2 and the ac magnetic field generating electromagnetic coil 3, whereby a vertical dc magnetic field $B_{DC}$ can be generated which passes through the conductive liquid 1.

In the second embodiment, the superimposition of the ac magnetic field generating electromagnetic coil 3 and the dc magnetic field generating electromagnetic coil 6 effects a still stronger generation of the compression waves in the conductive liquid 1 contained in the vessel 2. Thereby, improvement of the tissues after the solidification of the liquid and enhancement of the refining capabilities will sufficiently be accomplished.

Next, the apparatus for generating compression waves in a conductive liquid as the third embodiment of the invention will be described. As shown in FIG. 3, also in this embodiment, the apparatus comprises the vessel 2 containing the conductive liquid 1 (for example, molten metals or plastics, etc.), and the ac magnetic field generating electromagnetic coil 3 installed around the circumference of the vessel 2 as the ac electromagnetic force applying means, whereby the ac magnetic field $B_{AC}$ can be generated vertically.

And, in order to efficiently generate the compression waves in the conductive liquid 1 contained in the vessel 2, the frequency f of the ac power supply 4 for the ac magnetic field generating electromagnetic coil 3 is set by the frequency controller 5 within the range given by the [expression 1].

And, the dc magnetic field generating electromagnetic coil 6 is further installed so as to surround the circumference of the vessel 2 and the ac magnetic field generating electromagnetic coil 3, whereby the vertical dc magnetic field $B_{DC}$ can be generated which passes through the conductive liquid 1. However, in this third embodiment, the dc magnetic field generating electromagnetic coil 6 is configured to function as a superconducting magnet by a cooling means 6a being a double cylindrical wall-formed container that contains a very low temperature liquid such as a liquefied helium to soak the electromagnetic coil 6. And, the vessel 2 containing the conductive liquid 1 and the ac magnetic field generating electromagnetic coil 3 are inserted in the bore of this superconducting magnet.

Thereby, the superimposition effect by the ac magnetic field generating electromagnetic coil 3 and the superconducting magnet 6, 6a generates more intensified compression waves in the conductive liquid 1, for example a molten iron, thereby leading to improvement of the material after the solidification of the liquid still more efficiently.

Next, the apparatus for generating compression waves in a conductive liquid as the fourth embodiment of the invention will be described. As shown in FIG. 4, the apparatus comprises the vessel 2 containing the conductive liquid 1

(for example, molten metals or plastics, etc.), and a pair of electrodes 7, 7 mounted on the circumferential wall of the vessel 2 as the ac electromagnetic force applying means, whereby an alternate current $J_{AC}$ can be flown through the conductive liquid 1.

And, in order to efficiently generate the compression waves in the conductive liquid 1 contained in the vessel 2, the frequency f of the ac power supply 4 connected to the electrodes 7, 7 is set by the frequency controller 5 within the range given by the [expression 1].

Since the apparatus for generating compression waves in a conductive liquid as the fourth embodiment does not require the ac magnetic field generating electromagnetic coil, the total construction of the apparatus will be simplified remarkably. And in addition, the compression waves can be generated efficiently in the conductive liquid 1 contained in the vessel 2, by setting the frequency f of the applied alternate current within the range given by the [expression 1], based on the aforementioned reason; thus contributing to improvement of the material after solidification of the liquid 1.

In this embodiment, when the conductive liquid 1 is a high-temperature molten metal, the material of the electrodes 7 is required to be resistant to a high temperature as well as being conductive, and the electrodes 7 are made up with, for example, $ZrB_2$ made of boron and zirconium.

Next, the fifth embodiment of the invention will be described. As shown in FIG. 5, the apparatus of this embodiment comprises, basically in the same manner as in the fourth embodiment, the vessel 2 containing the conductive liquid 1, and a pair of the electrodes 7, 7 mounted on the circumferential wall of the vessel 2 as the ac electromagnetic force applying means, whereby the alternate current $J_{AC}$ can be flown through the conductive liquid 1.

And, in order to efficiently generate the compression waves in the conductive liquid 1 contained in the vessel 2, the frequency f of the ac power supply 4 connected to the electrodes 7, 7 is set by the frequency controller 5 within the range given by the [expression 1].

In this fifth embodiment, the dc magnetic field generating electromagnetic coil 6 is further installed so as to surround the circumference of the vessel 2, whereby the vertical dc magnetic field $B_{DC}$ can be generated which passes through the conductive liquid 1.

Thus, according to the fifth embodiment, the superimposition of the alternate current $J_{AC}$ flowing through the conductive liquid 1 and the vertical dc magnetic field $B_{DC}$ effects a still stronger generation of the compression waves in the conductive liquid 1 contained in the vessel 2. Thereby, improvement of the tissues after the solidification of the conductive liquid 1 and enhancement of the refining capabilities will sufficiently be accomplished.

Further, in the sixth embodiment of the invention shown in FIG. 6, compared with the fifth embodiment in FIG. 5, the dc magnetic field generating electromagnetic coil 6 is configured to function as a superconducting magnet by the cooling means 6a being a double cylindrical wall-formed container that contains a very low temperature liquid such as a liquefied helium. And, the vessel 2 containing the conductive liquid 1 and provided with the eletrodes 7 is inserted in the bore of this superconducting magnet.

Thereby, the synergistic effect by the alternate current $J_{AC}$ applied to the conductive liquid 1 and the dc magnetic field $B_{DC}$ generated by the superconducting magnet 6, 6a generates more intensified compression waves in the conductive liquid 1, such as a molten iron, thereby achieving improvement of the material after the solidification of the conductive liquid 1 still more efficiently.

Next, the apparatus for generating compression waves in a conductive liquid as the seventh embodiment of the invention will be described. As shown in FIG. 7, the vessel 2 containing the conductive liquid 1 is formed of ceramics as magnesia (MgO), and a metal reinforcing material 8 (reinforcing metal plate in this embodiment) is applied to the circumference of the vessel 2.

Further, the ac magnetic field generating electromagnetic coil 3 as the ac electromagnetic force applying means is disposed overlying the vessel 2, so as to generate the vertical ac magnetic field $B_{AC}$ efficiently without being influenced by the metal reinforcing material 8.

And, in order to efficiently generate the compression waves in the conductive liquid 1 contained in the vessel 2, the frequency of the ac power supply 4 for the ac magnetic field generating electromagnetic coil 3 is set by the frequency controller 5 within the range given by the [expression 1].

The apparatus for generating compression waves in a conductive liquid as the seventh embodiment, while the ceramic vessel 2 maintains a sufficient strength given by the metal reinforcing material 8, is able to generate intensified compression waves in the conductive liquid 1 without being influenced by the metal reinforcing material 8 by the ac magnetic field generating electromagnetic coil 3 disposed to overlie the vessel 2. Thus, material improvement after the solidification of the conductive liquid 1 will be accomplished by degassing of the conductive liquid 1 and micro structuring of the tissues.

Further, in addition to the magnesia having the melting point of 2800° C., the vessel 2 can employ as a material alumina ($Al_2O_3$, melting point 2080° C.), silica ($SiO_2$, melting point 1710° C.), or the like. For example, it is possible to contain a molten silica as a conductive liquid in a vessel made of a magnesia and apply a treatment to the liquid by means of the compression waves accordingly.

Next, the apparatus for generating compression waves in a conductive liquid as the eighth embodiment of the invention will be described. As shown in FIG. 8, the apparatus of this embodiment comprises, in the same manner as in the seventh embodiment, the ceramic vessel 2 with the metal reinforcing material 8, which contains the conductive liquid 1, and the ac magnetic field generating electromagnetic coil 3 overlying the vessel 2 as the ac electromagnetic force applying means, whereby the vertical ac magnetic field $B_{AC}$ can be generated.

And, in order to efficiently generate the compression waves in the conductive liquid 1 contained in the vessel 2, the frequency f of the ac power supply 4 for the ac magnetic field generating electromagnetic coil 3 is set by the frequency controller 5 within the range given by the [expression 1].

In this eighth embodiment, the dc magnetic field generating electromagnetic coil 6 is further installed so as to surround a part or the whole of the vessel 2 and the ac magnetic field generating electromagnetic coil 3, whereby the vertical dc magnetic field $B_{DC}$ can be generated which passes inside the conductive liquid 1.

In the eighth embodiment, the superimposition of the ac magnetic field generating electromagnetic coil 3 and the dc magnetic field generating electromagnetic coil 6 effects a still stronger generation of the compression waves in the conductive liquid 1 contained in the vessel 2. Thereby, improvement of the tissues after the solidification of the conductive liquid 1 and enhancement of the refining capabilities will sufficiently be accomplished.

Further, in the same manner as the seventh embodiment, the strength of the ceramic vessel 2 for containing a high temperature conductive liquid 1 can be increased sufficiently by the metal reinforcing material 8, and since the ac magnetic field generating electromagnetic coil 3 is disposed overlying the vessel 2, the electromagnetic effect of the coil 3 cannot be influenced by the metal reinforcing material 8.

Figure 9:
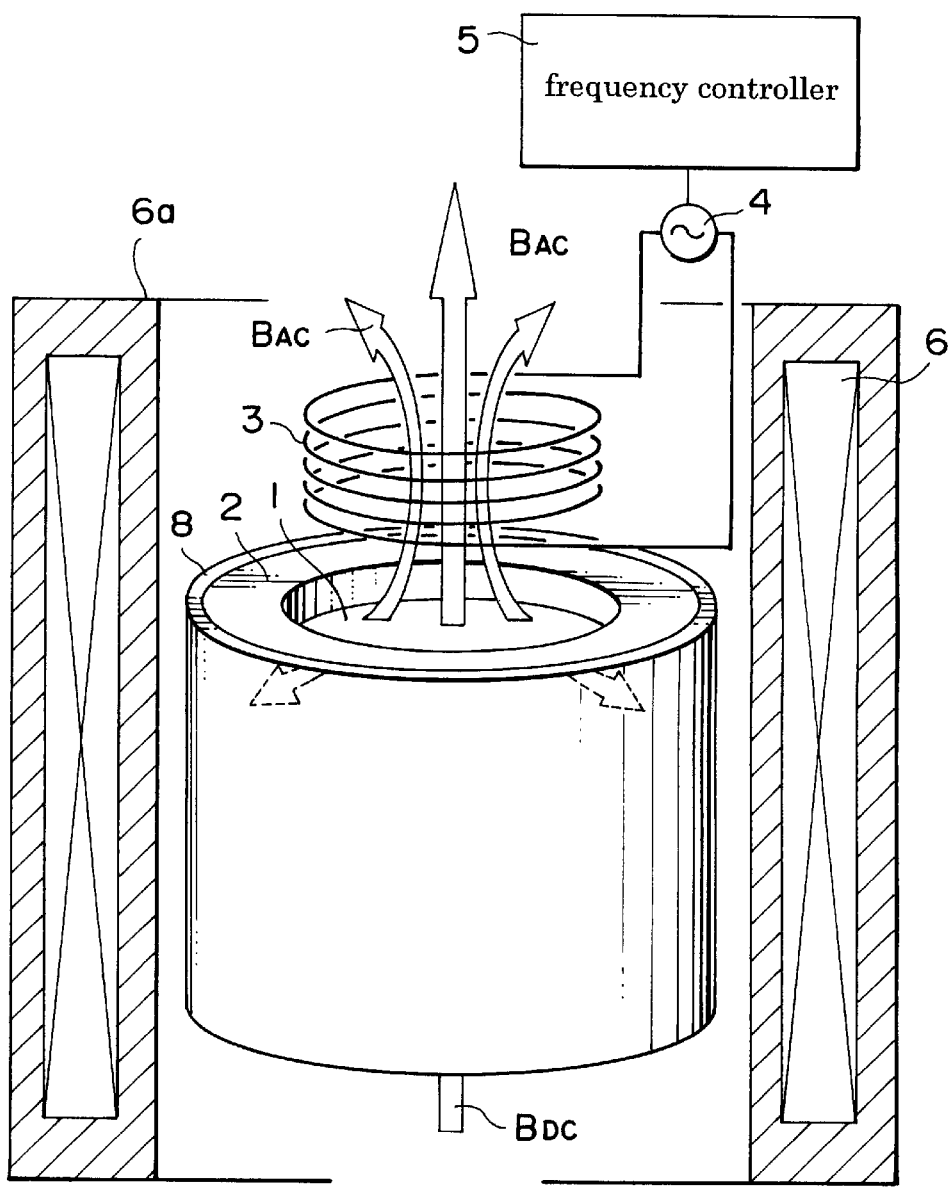
FIG. 9 is an explanatory drawing to typically illustrate an apparatus for generating compression waves in a conductive liquid as a ninth embodiment of the invention.

Next, the apparatus for generating compression waves in a conductive liquid as the ninth embodiment of the invention will be described. As shown in FIG. 9, the apparatus of this embodiment also comprises the ceramic vessel 2 with the metal reinforcing material 8, which contains the conductive liquid 1 (molten metals or plastics, etc.), and the ac magnetic field generating electromagnetic coil 3 overlying the vessel 2 as the ac electromagnetic force applying means, whereby the vertical ac magnetic field $B_{AC}$ can be generated.

And, in order to efficiently generate the compression waves in the conductive liquid 1 contained in the vessel 2, the frequency f of the ac power supply 4 for the ac magnetic field generating electromagnetic coil 3 is set by the frequency controller 5 within the range given by the [expression 1].

Further, the dc magnetic field generating electromagnetic coil 6 is installed so as to surround the circumference of the vessel 2 and the ac magnetic field generating electromagnetic coil 3, whereby the vertical dc magnetic field $B_{DC}$ can be generated which passes inside the conductive liquid 1; however in the ninth embodiment, the dc magnetic field generating electromagnetic coil 6 is configured to function as a superconducting magnet by the cooling means 6a being a double cylindrical wall-formed container that contains a very low temperature liquid such as a liquefied helium to soak the electromagnetic coil 6. And, the vessel 2 containing the conductive liquid 1 and the ac magnetic field generating electromagnetic coil 3 are inserted in the bore of this superconducting magnet.

Thereby, the superimposition effect by the ac magnetic field generating electromagnetic coil 3 and the superconducting magnet 6, 6a generates more intensified compression waves in the conductive liquid 1, for example a molten iron, thereby leading to improvement of the material after the solidification of the conductive liquid 1 still more efficiently.

As the invention has been described in detail, the apparatus for generating compression waves in a conductive liquid according to the invention will achieve the following effects.

(1) Since the ac frequency of the ac electromagnetic force applying means that generates the compression waves in a conductive liquid contained in a vessel is set within an appropriate range, the compression waves can be generated with a sufficient strength, and thereby, degassing of the conductive liquid and micro structuring of the tissues are effected, and material improvement after the solidification of the conductive liquid is carried out efficiently.

(2) When the ac magnetic field generating electromagnetic coil as the ac electromagnetic force applying means is installed around the circumference of the vessel, the compression waves are generated in the conductive liquid contained in the vessel with a simplified construction and a low cost.

(3) When, in addition to the ac magnetic field generating electromagnetic coil, a dc magnetic field generating electromagnetic coil is further installed around the circumference of the vessel, the superimposition of both the electromagnetic coils effects a stronger generation of the compression waves in the conductive liquid contained in the vessel, and thereby, enhancement of the refining capabilities of the conductive liquid and improvement of the tissues after the solidification of the liquid is sufficiently accomplished.

(4) When the dc magnetic field generating electromagnetic coil is made up with a superconducting magnet, and the vessel and the ac magnetic field generating electromagnetic coil are inserted in the bore of the superconducting magnet, the superimposition of both the dc magnetic field generating electromagnetic coil as the superconducting magnet and the ac magnetic field generating electromagnetic coil effects a still stronger generation of the compression waves in the conductive liquid contained in the vessel, and still more efficient improvement of the material after the solidification of the conductive liquid is achieved.

(5) When the ac electromagnetic force applying means is made up with a pair of electrodes that are installed at positions on a circumferential wall of the vessel facing to each other so as to energize the conductive liquid in the vessel and the ac power supply connected to the electrodes, and furthermore the dc magnetic field generating electromagnetic coil is installed around the circumference of the vessel, the ac magnetic field generating electromagnetic coil is not required; and accordingly, the total construction of the apparatus is simplified remarkably, and in addition, the compression waves is generated efficiently in the conductive liquid contained in the vessel so as to contribute to material improvement after the solidification of the liquid.

(6) Also in case of (5), when the dc magnetic field generating electromagnetic coil is made up with a superconducting magnet, in the bore of which is inserted the vessel with the electrodes, the effect of a strong electromagnetic force by the dc magnetic field generating electromagnetic coil as the superconducting magnet is superimposed on the effect by the ac electromagnetic force applying mean by a pair of the electrodes, which generates the compression waves still more effectively in the conductive liquid contained in the vessel, and thereby material improvement after the solidification of the liquid is achieved.

(7) In case that the vessel is formed of ceramics resistant to a high temperature and reinforced by a metal reinforcing material on the circumference of the vessel, when the ac magnetic field generating electromagnetic coil is provided to overlie the vessel so that the electromagnetic effect of the coil is designed not to be influenced by the metal reinforcing material, it is possible to satisfy both the vessel maintaining a sufficient strength and a strong generation of the compression waves in the vessel.

(8) In case of (7), when an electromagnetic coil generating a strong dc magnetic field is provided around the circumference of the vessel, the superimposition effect by association with the ac magnetic field generating electromagnetic coil intensifies generation of the compression waves in the conductive liquid contained in the vessel, thereby improving the material after the solidification of the liquid more effectively.

(9) In case of (8), when the dc magnetic field generating electromagnetic coil is made up with a superconducting magnet, a still stronger generation of the compression waves in the conductive liquid contained in the vessel is effected, and an effective material improvement after the solidification of the liquid is accomplished more efficiently.

What is claimed is:

1. A method for generating compression waves in a conductive liquid, comprising the steps of:
   providing a conductive liquid in a vessel;

using an ac electromagnetic force applying means to generate compression waves in the conductive liquid contained in the vessel; and controlling the ac electromagnetic force applying means so that an ac frequency "f" of the ac electromagnetic force applying means is set only within the range defined by the following expression 1:

$$\frac{2}{L^2 \pi \mu \sigma} \leq f \leq \frac{c^2 \mu \sigma}{2\pi}$$

wherein f is a major frequency when a waveform of an electromagnetic force is developed by the Fourier transform, in case of the waveform being a non-sine wave, L is a characteristic length of the system including one of a depth or a radius of the vessel containing the conductive liquid, $\mu$ is a permeability of the conductive liquid, $\sigma$ is an electric conductivity of the conductive liquid, and c is a propagation velocity of the compression waves in the conductive liquid.

2. A method for generating compression waves in a conductive liquid according to claim 1; wherein the step of using an ac electromagnetic force applying means comprises the step of providing an ac magnetic field generating electromagnetic coil around a circumference of the vessel.

3. A method for generating compression waves in a conductive liquid according to claim 2; further comprising the step of providing a dc magnetic field generating electromagnetic coil around the circumference of the vessel.

4. A method for generating compression waves in a conductive liquid according to claim 3; wherein the dc magnetic field generating electromagnetic coil is a superconducting magnet; and further comprising the step of providing the vessel and the ac magnetic field generating electromagnetic coil in a bore of the superconducting magnet.

5. A method for generating compression waves in a conductive liquid according to claim 1; wherein the step of using an ac electromagnetic force applying means comprises the steps of installing a pair of electrodes at positions on a circumferential wall of the vessel facing each other so as to energize the conductive liquid, and connecting an ac power supply to the electrodes.

6. A method for generating compression waves in a conductive liquid according to claim 5; further comprising the step of providing a dc magnetic field generating electromagnetic coil around the circumference of the vessel provided with the electrodes.

7. A method for generating compression waves in a conductive liquid according to claim 6; wherein the dc magnetic field generating electromagnetic coil is a superconducting magnet; and further comprising the step of providing the vessel with the pair of electrodes in a bore of the superconducting magnet.

8. A method for generating compression waves in a conductive liquid according to claim 1; wherein the vessel is formed of a ceramic material and is provided with a metal reinforcing material on the circumference thereof, and the ac electromagnetic force applying means comprises an ac magnetic field generating electromagnetic coil provided overlying the vessel.

9. A method for generating compression waves in a conductive liquid according to claim 8; further comprising the step of providing a dc magnetic field generating electromagnetic coil provided around the circumference of the vessel.

10. A method for generating compression waves in a conductive liquid according to claim 9; wherein the dc magnetic field generating electromagnetic coil is a superconducting magnet; and further comprising the step of providing the vessel in a bore of the superconducting magnet.

* * * * *